US012589613B2

(12) United States Patent
John

(10) Patent No.: US 12,589,613 B2
(45) Date of Patent: Mar. 31, 2026

(54) MARKING AND MEASURING FASTENER

(71) Applicant: L&L Tools, LLC, Mount Pleasant, SC (US)

(72) Inventor: Brandon John, Mount Pleasant, SC (US)

(73) Assignee: L&L Tools, LLC, Mount Pleasant, SC (US)

( * ) Notice: Subject to any disclaimer, the term of this patent is extended or adjusted under 35 U.S.C. 154(b) by 328 days.

(21) Appl. No.: 18/364,517

(22) Filed: Aug. 3, 2023

(65) Prior Publication Data

US 2025/0042196 A1 Feb. 6, 2025

(51) Int. Cl.
*B44D 3/38* (2006.01)

(52) U.S. Cl.
CPC .................................... *B44D 3/38* (2013.01)

(58) Field of Classification Search
CPC ........................................................ B44D 3/38
See application file for complete search history.

(56) References Cited

U.S. PATENT DOCUMENTS 2,663,938 A * 12/1953 Stodgell .............. E04G 21/1825 D8/394
4,995,152 A * 2/1991 Steckler .................. B44D 3/38 33/409
5,822,874 A 10/1998 Nemes
5,937,532 A * 8/1999 Eirich ...................... B44D 3/38 33/413
6,415,519 B1 7/2002 Bennett
6,931,743 B1 * 8/2005 Scarborough ............ B44D 3/38 33/758
6,957,495 B1 10/2005 Schmillen
7,594,336 B2 9/2009 Spaulding
7,735,231 B2 6/2010 Schardt
7,770,300 B2 8/2010 Johnson
7,913,408 B2 * 3/2011 Grisham .................. B44D 3/38 33/1 LE
8,006,456 B1 * 8/2011 Green ....................... E04D 1/34 52/543
8,713,810 B2 5/2014 Spaulding
9,701,154 B2 7/2017 Parker et al.
9,701,155 B2 * 7/2017 Henderson ............... B44D 3/38
10,071,594 B2 9/2018 Chernyshou et al.
11,679,620 B2 * 6/2023 Galvan .................... B44D 3/38 33/414
2021/0316567 A1 10/2021 Foust
2022/0316520 A1 10/2022 Wilson
2023/0060197 A1 3/2023 Galvan
2025/0042196 A1 * 2/2025 John ........................ B44D 3/38

FOREIGN PATENT DOCUMENTS

WO WO 2006/035423 A2 4/2006

* cited by examiner

*Primary Examiner* — Yaritza Guadalupe-Mccall
(74) *Attorney, Agent, or Firm* — Womble Bond Dickinson (US) LLP

(57) ABSTRACT

A fastener includes a body that defines an opening at one end of the body. The opening is defined by a first edge of the body, a second edge of the body, and a third edge of the body. The opening is configured to receive a chalk line. The fastener also includes a pin extending from the body, and a spacer at an end of the body opposite the opening. The spacer extends in the direction opposite the pin. A clip is at a distal end of the spacer from the body. The clip includes a pair of teeth.

20 Claims, 5 Drawing Sheets

MARKING AND MEASURING FASTENER

FIELD OF THE INVENTION

The present subject matter relates generally to fasteners, particularly chalk line fasteners for marking materials with chalk lines.

BACKGROUND OF THE INVENTION

A chalk line or chalk box is a tool used typically for marking long, straight lines on relatively flat surfaces. The chalk line allows for straight lines much farther than by hand. Chalk lines may be used to project straight lines between two points on constructive material, and typically include a reel and a fastener at each end of the chalk line. Typical fasteners for chalk lines are tied to a chalk line and the line is reeled into a housing of the reel. The housing is filled with chalk that transfers to the line as it is pulled out from the housing. The chalk can then be transferred to constructive material by a quick snap of the line after it is secured at both ends. However, the typical fasteners used for chalk lines can be troublesome, requiring additional components and/or excessive force to secure the fastener to the constructive material.

Accordingly, there currently is a need for an improved chalk line fastener for measuring and marking with chalk lines. In particular, a fastener that does not require additional components and/or may be easily secured to constructive material would be advantageous.

BRIEF DESCRIPTION OF THE INVENTION

Aspects and advantages of the invention will be set forth in part in the following description, or may be apparent from the description, or may be learned through practice of the invention.

In one example embodiment, a fastener defines a vertical direction, a lateral direction, and a transverse direction. The vertical, lateral, and transverse directions are mutually perpendicular. The fastener includes a body that defines an opening at one end of the body. The opening is defined by a first edge of the body, a second edge of the body, and a third edge of the body. The opening is configured to receive a chalk line. The fastener also includes a pin extending from the body in the transverse direction, and a spacer at an end of the body opposite the opening. The spacer extends in the transverse direction opposite the pin. A clip is at a distal end of the spacer from the body. The clip includes a pair of teeth extending in the vertical direction.

In another example embodiment, a chalk line fastener defines a vertical direction, a lateral direction, and a transverse direction. The vertical, lateral, and transverse directions are mutually perpendicular. The chalk line fastener is configured to secure a chalk line to constructive material. The chalk line fastener includes a body that defines an opening at one end of the body. The opening is defined by a first edge of the body, a second edge of the body, and a third edge of the body. The opening is configured to receive a chalk line. The chalk line fastener also includes a pin extending from the body in the transverse direction, and a spacer at an end of the body opposite the opening. The spacer extends in the transverse direction opposite the pin. A clip is at a distal end of the spacer from the body. The clip includes a pair of teeth extending in the vertical direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
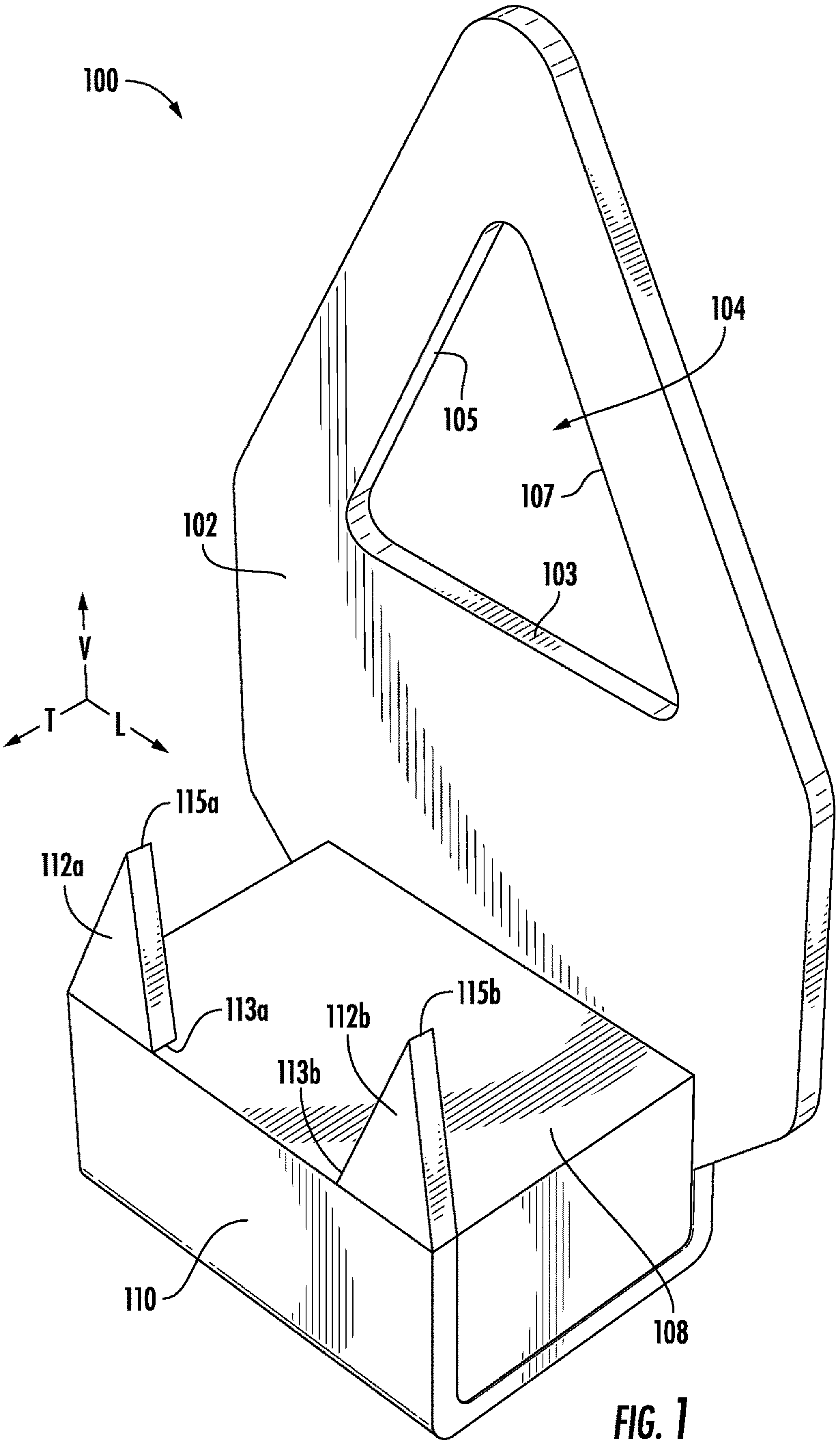
FIG. 1 illustrates an isometric view of an example fastener according to example embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to fasteners for measuring and marking surfaces. Specifically, the disclosed fastener is configured for use in association with chalk lines, chalk line reels, and any other suitable measuring reel. The fastener may include a body with an opening configured to receive the chalk line. As will be described below, the fastener may include a pin and a clip generally configured to secure the chalk line to a material, such as constructive material. In one embodiment, the fastener may generally be secured to a surface of the material via driving the pin into the material. Additionally or alternatively, the fastener may generally be secured to an edge of the material via the clip. By configuring the fastener as disclosed herein, the fastener may be advantageous when a user is operating alone and may provide secure hold of the chalk line in the middle of the material.

As stated above, the disclosed fastener is configured for use in association with chalk lines, chalk line reels, and any other suitable measuring reel. In one example, the fastener may be tied to the chalk line and the line is reeled into a housing of the reel. The housing may be filled with chalk that transfers to the chalk line as the chalk line is pulled out from the reel. The fastener may then be secured to the surface of the material via driving the pin into the material. Thus, when the reel side of the line is secured as desired, chalk can then be transferred to material by a quick snap of the line.

Referring now to FIGS. 1-5, several views of one embodiment of a chalk line fastener 100 are illustrated in accordance with aspects of the present subject matter. As may be seen in FIG. 1, a fastener 100 may define a vertical direction V, a lateral direction L, and a transverse direction T. As illustrated, the vertical direction V, lateral direction L, and transverse direction T may be mutually perpendicular. In general, fastener 100 may include a body 102 generally defining an opening 104 at one end of the body 102. In particular, as may be seen in FIG. 3, body 102 may extend between a bottom end 114 of the fastener 100 and a top end 116 of the fastener 100 in the vertical direction V. Further, the body 102 may extend between a first side 124 of the fastener 100 and a second side 126 of the fastener 100 in the lateral direction L. In some example embodiments, the bottom end 114 of the fastener 100 may be between one centimeter (1 cm) and five centimeters (5 cm) from the top end 116 in the vertical direction V. In other example embodiments, the bottom end 114 of the fastener 100 may be between two centimeters (2 cm) and four centimeters (4 cm) from the top end 116 in the vertical direction V, such as the bottom end 114 of the fastener 100 may be between two and a half centimeters (2.5 cm) and three and a half centimeters (3.5 cm) from the top end 116 in the vertical direction V.

Moreover, in some example embodiments, the first side 124 of the fastener 100 may be between one half centimeter (0.5 cm) and three centimeters (3 cm) from the second side 126 in the lateral direction L. In other example embodiments, the first side 124 of the fastener 100 may be between one centimeter (1 cm) and two centimeters (2 cm) from the second side 126 in the lateral direction L, such as the first side 124 of the fastener 100 may be between one and one-quarter centimeters (1.25 cm) and one and three-quarters centimeters (1.75 cm) from the second side 126 in the lateral direction L. The opening 104 of body 102 may be defined by a first edge 103, a second edge 105, and a third edge 107 of the body 102. The opening 104 may be generally configured to receive a chalk line, such as chalk line 130. In the current example embodiment, opening 104 may generally be triangularly shaped, as defined by the first edge 103, the second edge 105, and the third edge 107. In other example embodiments, opening 104 may be rectangular, square, circular, or any other suitable shape to receive chalk line 130.

Figure 2:
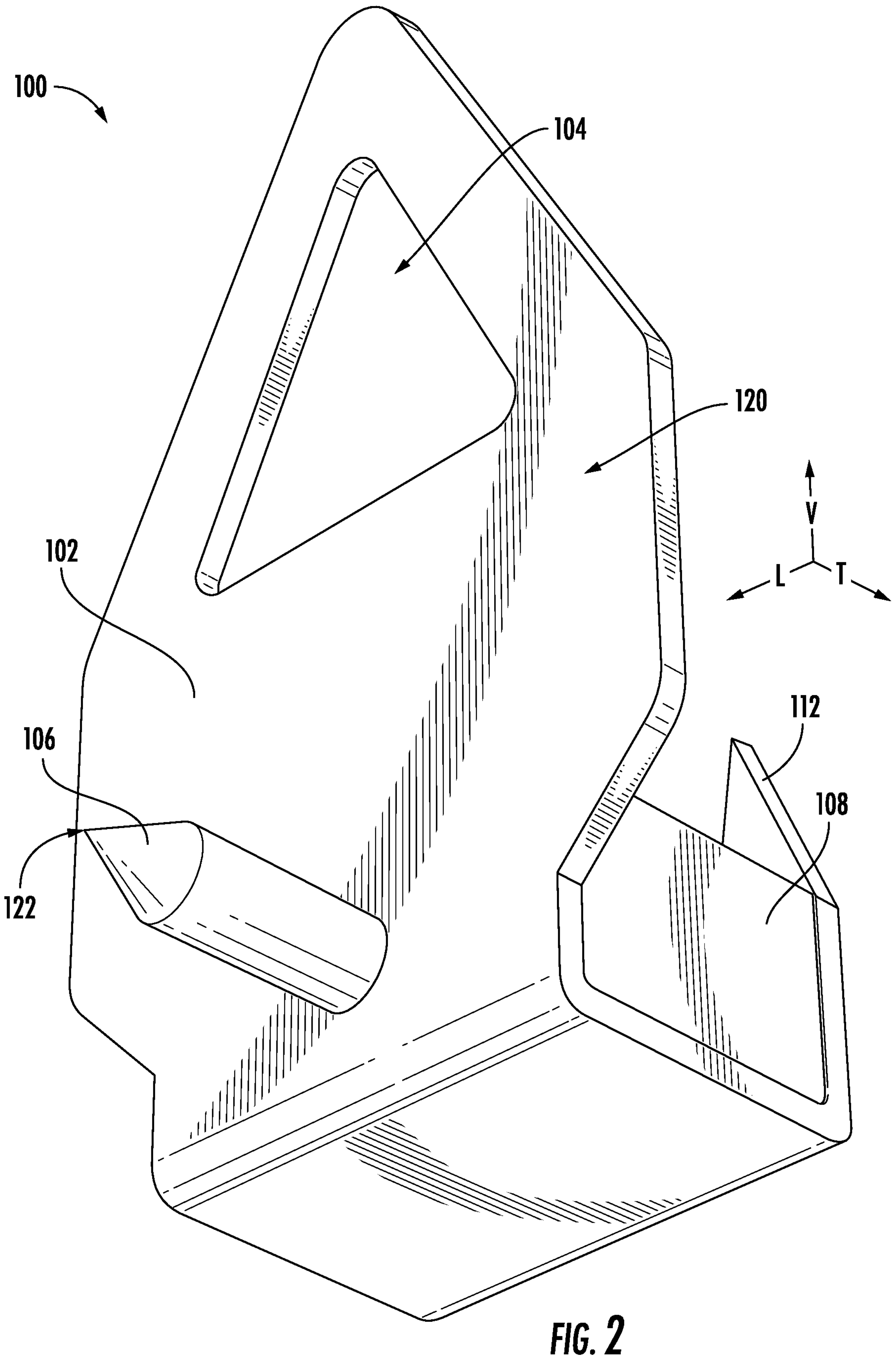
FIG. 2 illustrates another isometric perspective view of the example fastener of FIG. 1 according to aspects of the present disclosure.
Figure 3:
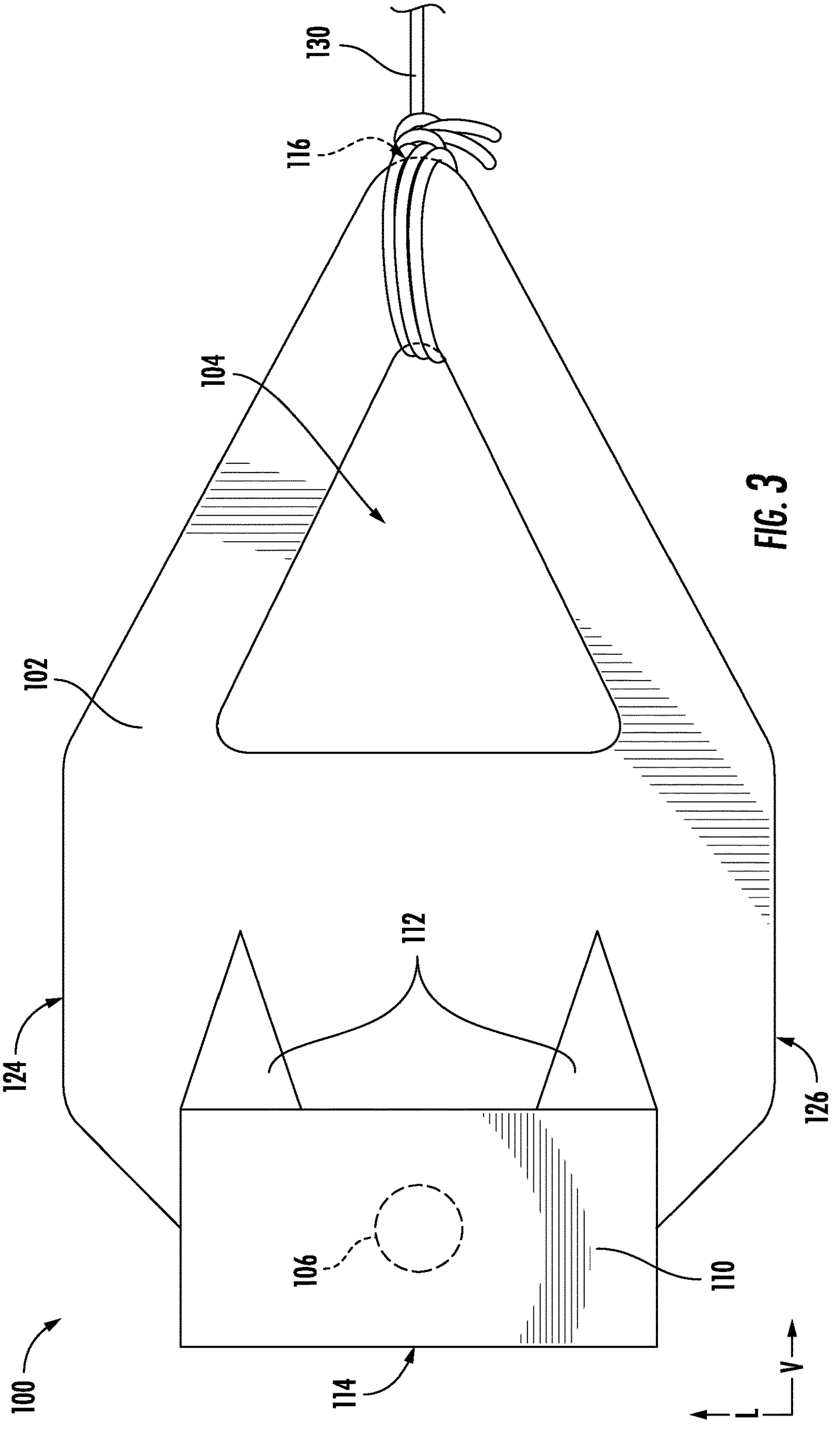
FIG. 3 illustrates an elevation view of the example fastener of FIG. 1 according to aspects of the present disclosure.
Figure 4:
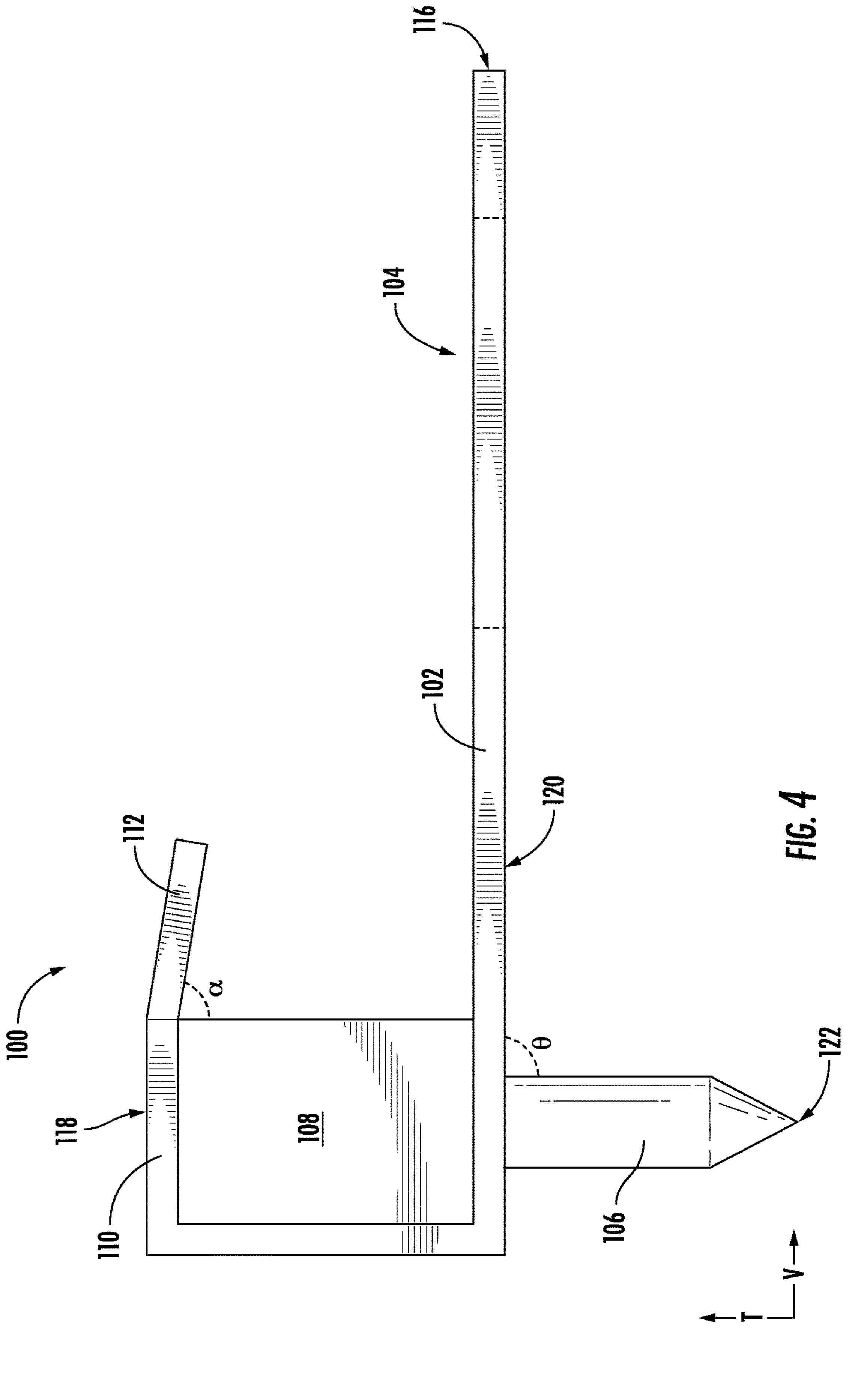
FIG. 4 illustrates a plan view of the example fastener of FIG. 1 according to aspects of the present disclosure.
Figure 5:
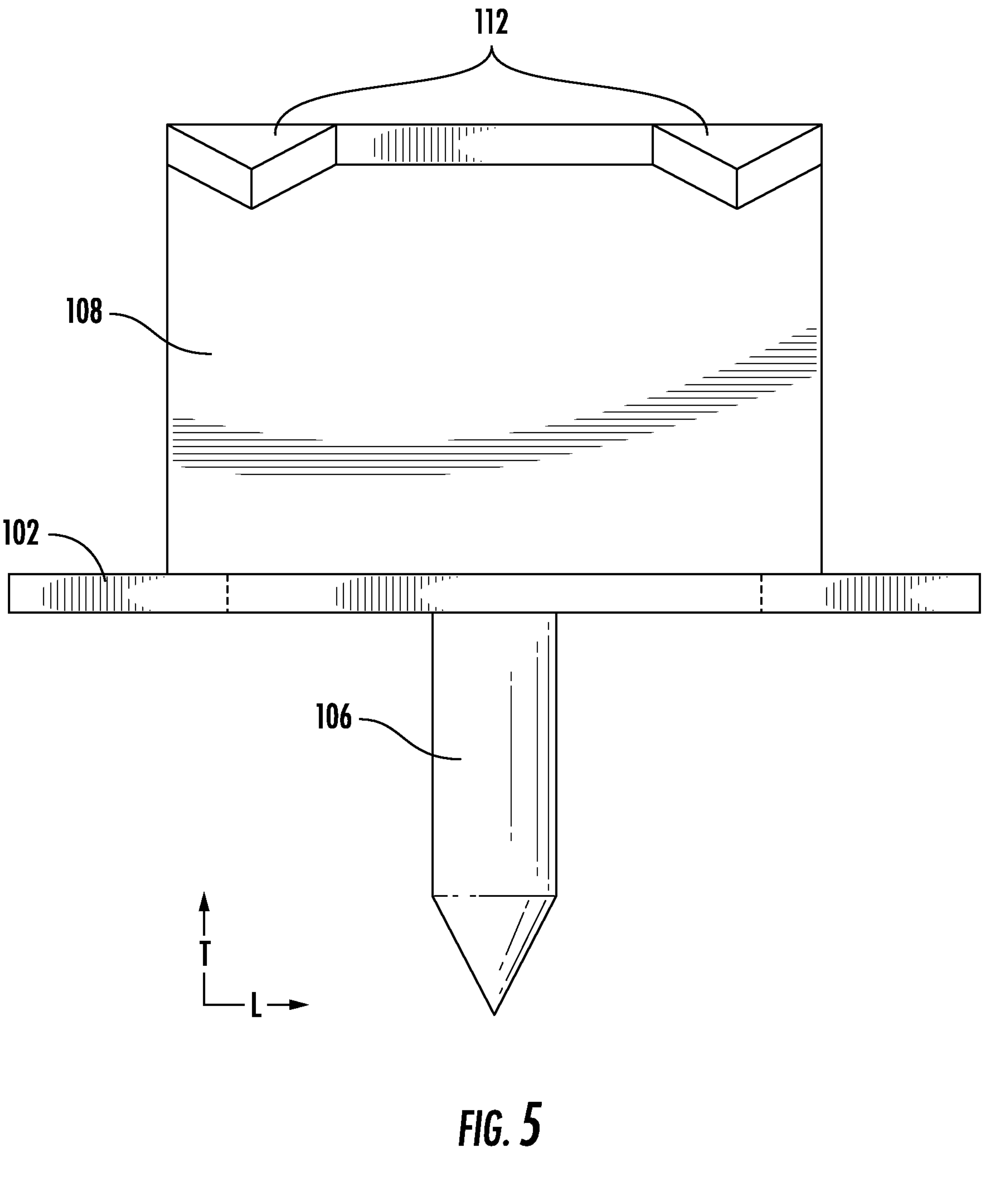
FIG. 5 illustrates a top view of the example fastener of FIG. 1 according to aspects of the present disclosure.

As may be seen in FIG. 2, fastener 100 may generally include a pin 106 extending from a back end 120 of body 102 in the transverse direction T to a tip 122 of the pin 106. In general, pin 106 may be pushed or driven into many different materials. In particular, fastener 100 may be one of steel, stainless steel, aluminum, or dense plastic such that fastener 100 is configured to withstand impact when mounting the pin 106 onto constructive material. For example, pin 106 may be driven by hammer into constructive materials such as plywood, however, in less dense materials such as gypsum boards or foams, pin 106 may be pushed by hand into the material. Just as pin 106 may be pushed or driven into materials, pin 106 may also be pulled or pried from the material when no longer necessary. In some example embodiments, pin 106 may extend at an angle θ, as shown in FIG. 4, of eighty degrees (80°) to one-hundred degrees (100°) from the vertical direction V to the transverse direction T. In other example embodiments, angle θ may be between eighty-five degrees (85°) to ninety-five degrees (95°), such as eighty-eight degrees (88°) to ninety-two degrees (92°) from the vertical direction V to the transverse direction T.

Referring now to FIG. 4, fastener 100 may generally include a spacer 108 at an end of the body opposite the opening 104, e.g., opening 104 may be proximate top end 116 and spacer 108 may be proximate bottom end 114. In general, the spacer 108 may extend from body 102 in the transverse direction T opposite the pin 106. In particular, in some example embodiments, the spacer 108 may extend between one tenth centimeter (0.1 cm) and one centimeter (1 cm) in the transverse direction T. In other example embodiments, the spacer 108 may extend between one-quarter centimeter (0.25 cm) to one and three-quarters centimeter (0.75 cm) in the transverse direction T, such as between one-third centimeter (0.33 cm) and two-thirds centimeter (0.66 cm) in the transverse direction T. Spacer 108 will be described in further detail herein.

A distal end of the spacer 108 from body 102 defines a front end 118 of the fastener 100. For example, fastener 100 may extend between front end 118 of the fastener 100 and tip 122 of pin 106 in the transverse direction T. In particular, in some example embodiments, the front end 118 of the fastener 100 may be between one half centimeter (0.5 cm) and three centimeters (3 cm) from the tip 122 of the pin 106 in the transverse direction T. In other example embodiments, front end 118 of the fastener 100 may be between one centimeter (1 cm) and two centimeters (2 cm) from the tip 122 of the pin 106 in the transverse direction T, such as front end 118 of the fastener 100 may be between one and one-quarter centimeters (1.25 cm) and one and three-quarters centimeters (1.75 cm) from the tip 122 of the pin 106 in the transverse direction T.

Referring now to FIGS. 1, and 3-5, fastener 100 may generally include a clip 110 at the distal end of spacer 108, e.g., front end 118 of the spacer 108 from the body 102. Clip 110 may generally include a pair of teeth 112 extending in the vertical direction. In example embodiments, each tooth 112*a*, 112*b* of the pair of teeth 112 may extend between a base 113*a*, 113*b* and a tip 115*a*, 115*b* of each tooth 112*a*, 112*b* respectively. Moreover, each tooth 112*a*, 112*b* of the pair of teeth 112 may narrow from the base 113*a*, 113*b* to the tip 115*a*, 115*b* such that the pair of teeth 112 may be sharply pointed in order to grip into constructive material the fastener 100 is placed thereupon. In the current example embodiment, the pair of teeth 112 may generally be triangularly shaped, e.g., narrowing from the base 113*a*, 113*b* to the tip 115*a*, 115*b*. In other example embodiments, the pair of teeth 112 may generally be rounded at the tip 115*a*. 115*b* while still gripping the constructive material. For example, when an edge of the constructive material is available, fastener 100 may generally be secured to the edge of the material via the pair of teeth 112 of clip 110. In general, spacer 108 may advantageously provide depth (e.g., in the transverse direction T) to fastener 100, e.g., increasing the distance from the front end 118 of the spacer 108 from the body 102 may advantageously provide increased leverage for securing fastener 100 into constructive material. In other words, increasing the depth of fastener 100 with spacer 108 may advantageously increase the ability of fastener 100 to be secured to constructive material.

In some example embodiments, the pair of teeth 112 may extend at an angle α, as shown in FIG. 4, of sixty degrees (60°) to eighty-nine degrees (89°) from the transverse direction T to the vertical direction V. In other example embodiments, angle α may be between seventy degrees (70°) to eighty-five degrees (85°) from the transverse direction T to the vertical direction V, such as seventy-five degrees (75°) to eighty degrees (80°) from the transverse direction T to the vertical direction V. In particular, angle α of the pair of teeth 112 may be advantageous for gripping into constructive material while under tension from chalk line 130, e.g., chalk line 130 may be pulled across the constructive material, thus providing tension force, digging the pair of teeth 112 into the constructive material.

As may be seen from the above, a fastener may be a one-piece measuring and marking tool that includes a pin and a clip. The fastener may be advantageous when a user is operating alone and may provide secure hold of the chalk line in the middle of the material. In particular, the fastener may advantageously not require additional components, such as nails or fasteners, and may be easily secured to constructive material. The fastener being a single piece that includes a pin and a clip advantageously allows a user to avoid additional components to secure the fastener, whereby increasing worksite efficiency and reducing costs. Further, the pin and clip built directly into the fastener may provide advantageous robustness for long term use of the fastener.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A fastener defining a vertical direction, a lateral direction, and a transverse direction, the vertical, lateral, and transverse directions being mutually perpendicular, the fastener comprising:

- a body defining an opening at one end of the body, the opening defined by a first edge of the body, a second edge of the body, and a third edge of the body, the opening configured to receive a chalk line;
- a pin extending from the body in the transverse direction, wherein the pin extends at an angle of eighty degrees to one-hundred degrees from the vertical direction to the transverse direction;
- a spacer at an end of the body opposite the opening, the spacer extending in the transverse direction opposite the pin; and
- a clip at a distal end of the spacer from the body, the clip comprising a pair of teeth extending in the vertical direction, wherein the pair of teeth extend at an angle of sixty degrees to eighty-nine degrees from the transverse direction to the vertical direction.

2. The fastener of claim 1, wherein the pair of teeth extend between a base and a tip of each tooth, the pair of teeth narrowing from the base to the tip.

3. The fastener of claim 1, wherein the fastener is one of steel, stainless steel, aluminum, or dense plastic such that the fastener is configured to withstand impact when mounting the pin onto constructive material.

4. The fastener of claim 1, wherein the spacer extends between one- tenth centimeter to one and one centimeter in the transverse direction.

5. The fastener of claim 1, wherein the body extends between a bottom end of the fastener and a top end of the fastener in the vertical direction and extends between a first side of the fastener and a second side of the fastener in the lateral direction.

6. The fastener of claim 5, wherein the bottom end of the fastener is between one centimeter and five centimeters from the top end in the vertical direction.

7. The fastener of claim 5, wherein the first side of the fastener is between one half centimeter and three centimeters from the second side of the fastener in the lateral direction.

8. The fastener of claim 1, wherein the fastener extends between a front end of the fastener and a tip of the pin in the transverse direction.

9. The fastener of claim 8, wherein the front end of the fastener is between one half centimeter and three centimeters from the tip of the pin in the transverse direction.

10. The fastener of claim 1, wherein the spacer is transversely in line with a tip of the pin.

11. A chalk line fastener defining a vertical direction, a lateral direction, and a transverse direction, the vertical, lateral, and transverse directions being mutually perpendicular, the chalk line fastener configured to secure a chalk line to constructive material, the chalk line fastener comprising:

- a body defining an opening at one end of the body, the opening defined by a first edge of the body, a second edge of the body, and a third edge of the body, the opening configured to receive a chalk line;
- a pin extending from the body in the transverse direction;
- a spacer at an end of the body opposite the opening, the spacer extending in the transverse direction opposite the pin, wherein the pin extends at an angle of eighty degrees to one-hundred degrees from the vertical direction to the transverse direction; and
- a clip at a distal end of the spacer from the body, the clip comprising a pair of teeth extending in the vertical direction, wherein the pair of teeth extend at an angle of sixty degrees to eighty-nine degrees from the transverse direction to the vertical direction.

12. The chalk line fastener of claim 11, wherein the pair of teeth extend between a base and a tip of each tooth, the pair of teeth narrowing from the base to the tip.

13. The chalk line fastener of claim 11, wherein the chalk line fastener is one of steel, stainless steel, aluminum, or dense plastic such that the chalk line fastener is configured to withstand impact when mounting the pin onto constructive material.

14. The chalk line fastener of claim 11, wherein the spacer extends between one-tenth centimeter to one and one centimeter in the transverse direction.

15. The chalk line fastener of claim 11, wherein the body extends between a bottom end of the chalk line fastener and a top end of the chalk line fastener in the vertical direction and extends between a first side of the chalk line fastener and a second side of the chalk line fastener in the lateral direction.

16. The chalk line fastener of claim 15, wherein the bottom end of the chalk line fastener is between one centimeter and five centimeters from the top end in the vertical direction.

17. The chalk line fastener of claim 15, wherein the first side of the chalk line fastener is between one half centimeter and three centimeters from the second side of the chalk line fastener in the lateral direction.

18. The chalk line fastener of claim 11, wherein the chalk line fastener extends between a front end of the chalk line fastener and a tip of the pin in the transverse direction.

19. The chalk line fastener of claim 18, wherein the front end of the chalk line fastener is between one half centimeter and three centimeters from the tip of the pin in the transverse direction.

20. The chalk line fastener of claim 11, wherein the spacer is transversely in line with a tip of the pin.

* * * * *